United States Patent [19]
Sonnemann et al.

[11] Patent Number: 5,794,575
[45] Date of Patent: Aug. 18, 1998

[54] COOLANT CIRCUIT FOR MOTOR VEHICLES

[75] Inventors: Guenter Sonnemann, Aue; Mirko Sierakowski, Zwickau; Rainer Junghans, Reinsdorf, all of Germany

[73] Assignee: Behr GmbH & Co., Stuttgart, Germany

[21] Appl. No.: 735,506

[22] Filed: Oct. 23, 1996

[30] Foreign Application Priority Data

Oct. 31, 1995 [DE] Germany ............... 195 40 591.9

[51] Int. Cl.⁶ .................................................. F01P 7/14
[52] U.S. Cl. .................. 123/41.08; 123/41.29; 165/284; 237/12.3 B
[58] Field of Search .................. 123/41.08, 41.31, 123/41.29; 137/599.1, 110; 165/284, 286; 237/12.3 B

[56] References Cited

U.S. PATENT DOCUMENTS 4,874,010 10/1989 DeJong et al. ................ 137/110
5,215,044 6/1993 Bronzhaf et al. ............... 123/41.31

FOREIGN PATENT DOCUMENTS

| | | |
|---|---|---|
| 32 14 855 | 11/1982 | Germany . |
| 32 17 836 | 11/1983 | Germany . |
| 83 14 309 | 12/1984 | Germany . |
| 34 32 864 | 3/1986 | Germany . |
| 34 35 833 | 4/1986 | Germany . |
| 87 13 443 | 1/1988 | Germany . |
| 37 30 682 | 3/1989 | Germany . |
| 41 22 904 | 1/1993 | Germany . |
| 42 22 088 | 1/1994 | Germany . |
| 35 07 654 | 4/1994 | Germany . |
| 43 24 555 | 1/1995 | Germany . |
| 44 20 162 | 1/1995 | Germany . |

*Primary Examiner*—Noah P. Kamen
*Attorney, Agent, or Firm*—Foley & Lardner

[57] ABSTRACT

The invention relates to a method of controlling the flow-rate distribution in the coolant circuit for motor vehicles and, further, to an apparatus for carrying out this method. A throttling member actuated by differential pressure converts the pressure drop into a throttling action.

14 Claims, 3 Drawing Sheets

COOLANT CIRCUIT FOR MOTOR VEHICLES

BACKGROUND OF THE INVENTION

The present invention relates to a method of controlling the flow rate distribution in the coolant circuit for motor vehicles having a combustion engine or an electric motor. Furthermore, the invention also relates to an apparatus for carrying out this method.

Methods of this general type are known from the prior art, for example, DE-A 37 38 412. The flow volume through the individual heat exchangers such as the radiator and the heater heat exchanger is controlled in such earlier systems by controllable valves and an additional electric coolant pump. This method is relatively complex owing to the large number of individual components, including the electronic switch-gear.

In the case of modern motor vehicles, in particular passenger cars, sufficient heating output for the passenger compartment must be available even in the lower speed range, i.e., an adequate flow volume of coolant must be delivered through the heating branch and the heater heat exchanger. This means that, even at low engine speeds, the throughput of coolant may reach saturation at the heater heat exchanger and, as the engine speed or pump speed increases, an excessive flow volume of coolant is delivered through the heating branch, without bringing about any higher heat emission. At high engine loads, the radiator may even be deprived of this coolant throughput, which in the worst case can lead to overheating of the engine.

SUMMARY OF THE INVENTION

One object of the present invention is to provide a simple and improved method of flow-rate distribution in a coolant circuit of the generic type for motor vehicles.

Another object of the present invention is to provide such a method by which it is ensured that, on the one hand an adequate heat exchange is available at the heater heat exchanger and, on the other hand, sufficient heat can be dissipated by the radiator for cooling the engine.

It is also an object of the invention to provide an improved apparatus for flow-rate distribution in a coolant circuit of an engine for a motor vehicle.

In accomplishing the foregoing objects, there has been provided in accordance with one aspect of the present invention a method of controlling the flow-rate distribution in a coolant circuit for a motor vehicle having an engine, comprising: circulating coolant in the coolant circuit comprised of a first branch for cooling the engine and a second branch for heating a passenger compartment, including a coolant pump, a first heat exchanger for cooling and a second heat exchanger for heating; and controlling the coolant throughput by the first and/or the second heat exchanger as a function of coolant pressure drop.

In accordance with another aspect of the invention, there has been provided a method of controlling the flow-rate distribution in a coolant circuit for a motor vehicle having an engine, comprising: circulating coolant in the coolant circuit comprised of a first branch for cooling the engine, a second branch for heating a passenger compartment, a third branch for the charge-air cooling, a fourth branch for oil cooling, including a coolant pump, a first heat exchanger for engine cooling, a second heat exchanger for passenger compartment heating, a third heat exchanger for charge-air cooling, and a fourth heat exchanger for the oil cooling; and controlling the coolant throughput at at least one of the charge-air cooler and the oil cooler by throttling.

In accordance with another aspect of the invention, there has been provided an apparatus for controlling the flow-rate distribution in a coolant circuit for a motor vehicle having an engine, comprising: a coolant circuit comprised of a first branch for cooling the engine and a second branch for heating a passenger compartment, including a coolant pump, a first heat exchanger for cooling and a second heat exchanger for heating, and a throttling member activated by a differential pressure of the coolant in the coolant circuit.

Further objects, features and advantages of the present invention will become apparent from the detailed description of preferred embodiments that follows, when considered together with the attached figures of drawing.

BRIEF DESCRIPTION OF THE DRAWINGS

Exemplary embodiments of the invention are described in more detail below and are represented in the drawings, in which.

DETAILED DESCRIPTION OF THE PREFERRED EMBODIMENTS

Figure 1:
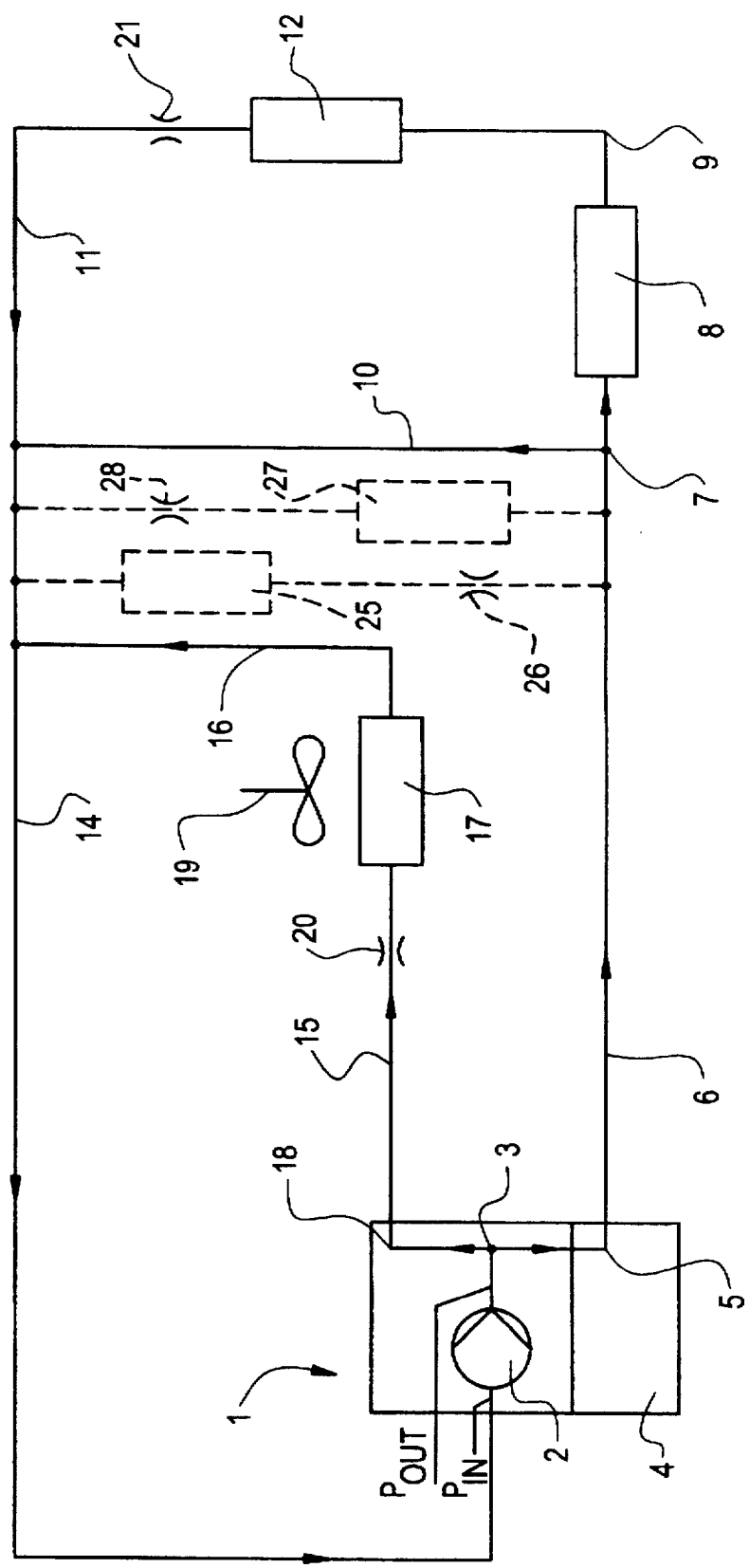
FIG. 1 is a diagrammatic representation of the coolant circuit for a motor vehicle.

According to the invention, the coolant throughput through the radiator or the heater heat exchanger is controlled in response to the coolant pressure drop, i.e., the latter is used as a controlled variable for the flow-rate distribution through the heating branch or the cooling branch of the overall coolant circuit.

According to one preferred aspect, the overall coolant circuit may include further branches with further heat exchangers, for example, for the charge-air cooling and oil cooling. At these heat exchangers, the coolant throughput can also be throttled as a function of the pressure drop.

According to another aspect of the invention, it is particularly advantageous if the coolant throughput is throttled when coolant saturation is reached at the heat exchanger. This saturation at the heat exchanger occurs when the heat exchange at the heat exchanger cannot be increased, or only insignificantly, by a further increase in the coolant throughput. Associated with the saturation is a certain pressure drop at the heat exchanger, which is used as a measured variable and a controlled variable.

According to still another aspect of the invention, it is advantageous to throttle the coolant throughput at the heater heat exchanger when there is saturation there, because then a greater proportion of the total coolant flow delivered by the coolant pump passes through the radiator and is consequently utilized for engine cooling. This control is particularly advantageous in the case of so-called air-controlled motor vehicle heaters, in which the air temperature is controlled by air flaps and by mixing warm and cold air.

In another preferred embodiment, the coolant throughput may also be throttled when there is saturation at the radiator, so that then the remaining proportional flow volume is utilized by the other branches of the coolant circuit.

Also, the pressure drop at the coolant pump may be used to throttle the coolant throughput for the overall system, to be specific whenever at relatively high engine speeds the entire flow volume is no longer required.

An apparatus for carrying out the method advantageously includes a throttling member which is actuated by the differential pressure of the coolant and consequently converts the coolant pressure drop at the heat exchanger concerned into an actuating movement of an actuating element. To this extent, this control proves to be particularly advantageous, because it is possible to dispense with electronic controls.

In an advantageous embodiment, the throttling member may be integrated directly into the heat exchanger, which brings with it assembly and production advantages.

According to a further feature of the invention, the throttling member may expediently be fitted into the partition of the water tank of the heater heat exchanger, since the pressure drop between the inlet side and outlet side of the heat exchanger is effective there.

Still another preferred embodiment is based on providing the throttling member with a diaphragm which is actuated on the one hand by the coolant pressure of the flow and on the other hand by the coolant pressure of the return, so that the differential pressure at the diaphragm is used for the activation of a shut-off element.

In another advantageous embodiment, the shut-off element is fitted directly at the outlet pipe connection of the heater heat exchanger, so that the coolant throughput is throttled there as a function of the pressure drop at the heater heat exchanger.

FIG. 1 shows first of all in a simplified representation the coolant circuit for the combustion engine 1. The coolant is delivered through the circuit by means of a coolant pump 2, driven by the combustion engine 1, and enters the cooling jacket of the engine 1 at the point 3. The coolant flows around the walls of the cylinder head 4 and enters the engine return line 6 at the point 5, and it then flows from there up to the branching point 7, where the coolant circuit branches into the radiator supply line 9 and the bypass or short-circuit line 10. A thermostat 8 controls the coolant throughput through the radiator supply line 9 to the radiator 12 or through the bypass 10 depending on the coolant temperature. The coolant leaving the radiator 12 finally flows through the radiator return line 11 into the engine stream 14 upstream of the coolant pump 2. In addition to the cooling branch 5–12 just described, in this coolant circuit there is provided a so-called heating branch, which comprises the coolant heating line sections 15 and 16 and the heater heat exchanger 17. The coolant leaves the engine 1 at the point 18 and flows through the heating supply line 15 into the heater heat exchanger 17, from which it flows via the heating return line 16 back into the engine stream 14 upstream of the coolant pump 2. The heater heat exchanger 17 is thus traversed on the primary side by the coolant and on the secondary side by air, which is heated in the heater heat exchanger 17. This heated air enters into the passenger compartment of the motor vehicle for heating. The motor-vehicle heater is advantageously a heater controlled on the air side (in contrast to a heater controlled on the water side), in which the desired air temperature is achieved by air flaps and by mixing warm and cold air streams, i.e., with an uncontrolled coolant flow volume through the heater heat exchanger 17. The delivery of the air through the heater heat exchanger is schematically indicated by a blower 19.

According to the invention, there is then arranged at the heater heat exchanger 17 a differential-pressure-activated throttling member 20, which, on the one hand, measures the pressure drop between heating supply line 15 and heating return line 16 and, on the other hand, mechanically converts it into a reduction of the flow cross section (throttling). As a result, the flow volume through the heater heat exchanger 17 is throttled, this throttling only commencing when the heater heat exchanger 17 has reached its saturation. This is the case whenever a further increase in the coolant throughput through the heater heat exchanger 17 no longer brings about any higher heat emission to the heating air. Owing to the changing of the flow resistance in the heating branch 15–18 by this throttling, a greater proportion of flow volume of the total coolant flow then flows through the radiator 12 (with thermostat 8 open), so that more heat can be emitted there from the coolant to the ambient air.

According to the invention, however, there may also be provided at or in the radiator, as a function of the pressure drop at the radiator 12, i.e., the pressure difference between radiator supply line 9 and radiator return line 11, a throttling member 21, which in the same way throttles the flow cross section and consequently reduces the flow volume through the radiator 12, or keeps it at a constant value when the saturation of the radiator is reached.

As shown with dashed lines in FIG. 1, it is also possible for the coolant circuit to include a third branch for the charge-air cooling including a third heat exchanger 25 and a throttling member 26 for charge-air cooling, and/or a fourth branch for oil cooling including a fourth heat exchanger 27 and a throttling member 28 for the oil cooling.

According to the invention, the pressure drop at the coolant pump may be used to throttle the coolant throughput for the overall system. The pressure differential $P_{IN}-P_{OUT}$ gives the value $\Delta P$ used for throttling at relatively high engine speeds when the entire flow volume is no longer required.

Figure 2:
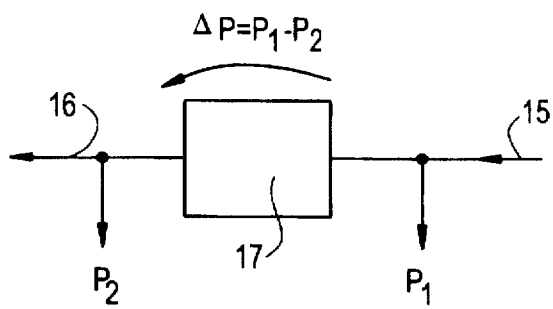
FIG. 2 is a diagram showing the pressure conditions at the heat exchanger.

In FIG. 2, the basic physical processes are illustrated, the corresponding reference numerals having been adopted from the heating branch in FIG. 1. The coolant flows via the heating supply line 15 into the heater heat exchanger 17 and out via the heating return line 16. The pressure $P_1$ prevails in the supply line 15 and —owing to the pressure drop of the coolant in the heater heat exchanger 17 —the lower pressure $p_2$ prevails in the return line 16. The pressure differential $p_1-p_2$ gives the value $\Delta p$, which is used as a measured variable and manipulated variable for the throttling.

Figure 3:
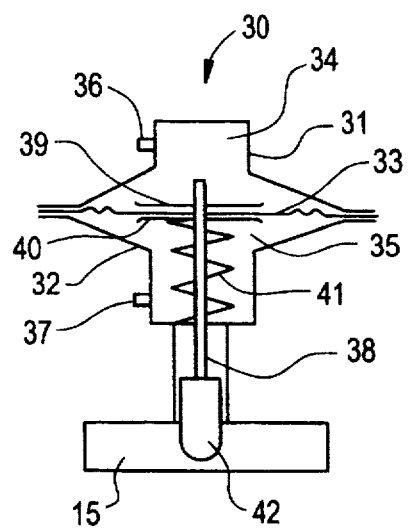
FIG. 3 is a schematic representation of the basic construction of a throttling member.

In FIG. 3 there is shown the basic construction of a throttling member according to the invention, as represented in simplified form in FIG. 1 by the reference numeral 20. In FIG. 3, this throttling member is shown as throttle valve 30, which has an upper housing part 31 and a lower housing part 32, which clamp a diaphragm 33 between them. The diaphragm 33 forms with the upper housing part 31 a pressure chamber 34 and with the lower housing part 32 a pressure chamber 35. The pressure chamber 34 is connected via a connection 36 to the coolant pressure $p_1$ in the supply and the pressure chamber 35 is connected via a connection 37 to the coolant pressure $p_2$ in the return line, so that the differential pressure $\Delta p$ of the coolant acts on the diaphragm 33, i.e., brings about a deflection of the diaphragm. In the central region of the diaphragm 33 there is fastened by means of plate-shaped fastening elements 39, 40 a rod 38, which at its other end bears a valving element 42, which projects into the cross section of the coolant line (heating supply line 15 or return 15, line 16) and consequently throttles or opens the coolant throughput. A restoring spring 41 surrounds the rod 38 and is supported on the one hand on the diaphragm 33 and on the other hand on the lower housing part 32.

The mode of operation of the throttling member according to the invention is as follows: when the differential pressure or pressure drop Δp at the heater heat exchanger 17 is great enough, that is to say has reached the predetermined value which corresponds to saturation, it brings about a deflection of the diaphragm 33 downwardly, against the action of the restoring supply spring 41, so that the cross section of the coolant supply line 15 is constricted. If the pressure differential Δp is less, the restoring spring 41 restores the diaphragm 33, so that the valving element 42 is drawn out from the cross section of the coolant supply line 15 and opens the latter again. The restoring spring 41 must consequently be adapted to the pressure differential expected with the particular heat exchanger.

Figure 4:
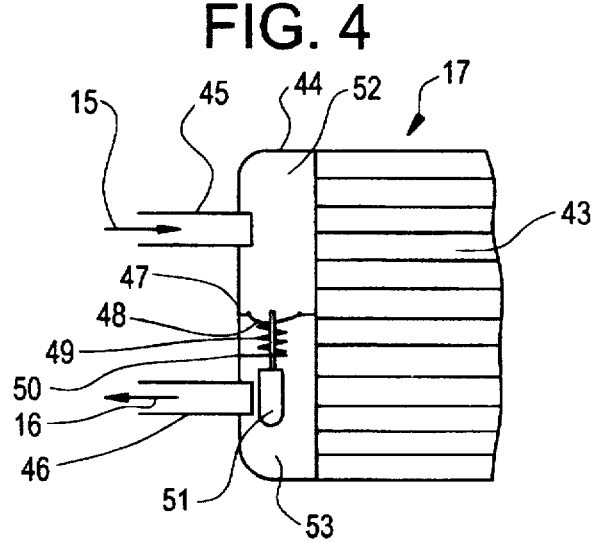
FIG. 4 is a schematic representation of an example of fitting the throttling member in the heat exchanger.

FIG. 4 shows an example of fitting the throttling member according to the invention into the heater heat exchanger 17, as the latter is schematically represented in FIG. 1. This heat exchanger 17 has in a conventional block of tubes 43, through which the coolant flows. The block of tubes 43 opens out into a so-called water tank 44, which has an inlet pipe connection 45 and an outlet pipe connection 46, as well as a partition 47 which subdivides the water tank 44 into an inlet chamber 52 and an outlet chamber 53. According to the invention, fastened to the periphery of the partition 47 is a diaphragm 48, which bears in its center (in a way comparable to that which has been shown in FIG. 3 and described) a rod with a valving element 51. There is further provided on the water tank 44 a spring support 50, on which is supported a compression spring 49 for restoring the diaphragm 48. It is clear from this representation that the differential pressure between inlet chamber 52 and outlet chamber 53 is effective at the diaphragm 48 and consequently brings about a deflection of the diaphragm downwardly, if there is a Δp which is large enough. The valving element 51 is arranged directly upstream of the outlet pipe connection 46 and consequently governs the flow cross section of the latter, so that a throttling of the coolant throughput takes place in the manner according to the invention.

Figure 5:
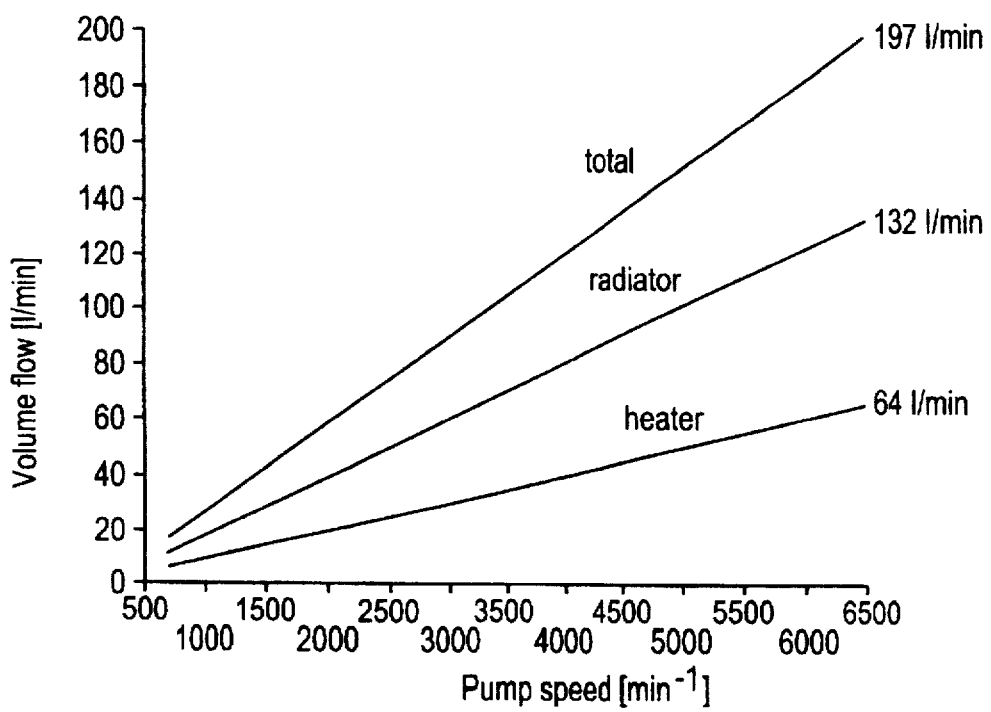
FIG. 5 is a diagram of the flow volumes in the case of the prior art.
Figure 6:
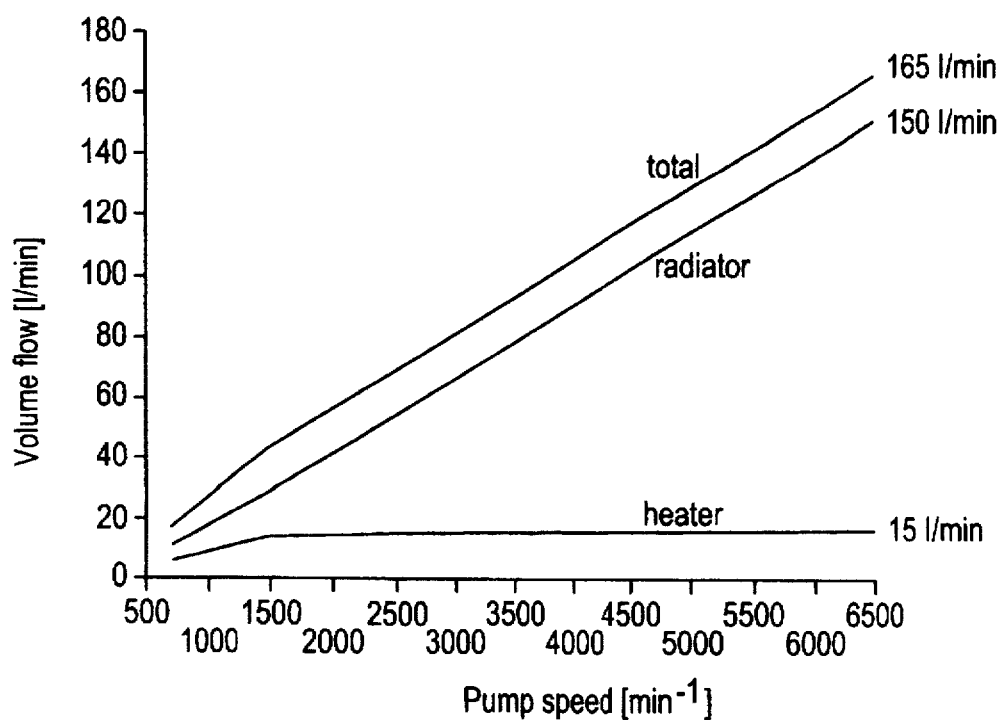
FIG. 6 is a diagram of the flow volumes in the case of the throttled heating flow volume according to the invention.

FIGS. 5 and 6 show the effects of the method according to the invention by two diagrams, in which the prior art (FIG. 5) and the invention (FIG. 6) are compared. FIG. 5 shows the flow volumes for the radiator and heater and the total flow volume which is delivered by the coolant pump, plotted against the pump speed: all three flow volumes increase linearly. In FIG. 6, on the other hand, from about 1500 rpm the flow volume for the heating branch is throttled and is constant at a saturation of about 15 l/min, while the flow volume for the radiator reaches a throughput of 150 l/min at 6500 rpm. By comparison, according to FIG. 5, with uncontrolled heating the flow volume for the radiator reaches only 132 l/min at 6500 rpm. The comparison of the two diagrams shows the significant advantage of the method according to the invention, which results in increasing the flow volume through the radiator.

The entire disclosure of German Patent Application No. 195 40 591.9, filed Oct. 31, 1995, is hereby incorporated by reference.

Although the present invention has been described above in terms of certain preferred embodiments, it is readily apparent that the invention can be embodied in additional design configurations. It is intended that the appended claims cover all possible embodiments of the invention.

What is claimed is:

1. A method of controlling the flow-rate distribution in a coolant circuit for a motor vehicle having an engine, comprising:
    circulating coolant in the coolant circuit comprised of a first branch for cooling the engine and a second branch for heating a passenger compartment, including a coolant pump, a first heat exchanger in the first branch for cooling coolant and a second heat exchanger in the second branch for heating air with the coolant; and throttling the coolant flow through the first and/or the second heat exchanger as a function of coolant pressure drop across a respective one of the heat exchangers; wherein the coolant flow is kept at a constant value at coolant saturation of the heat exchanger or when a predetermined pressure drop is reached.

2. The method as claimed in claim 1, wherein the coolant flow at the second heat exchanger is throttled.

3. The method as claimed in claim 1, wherein the coolant flow at the first heat exchanger is throttled.

4. The method as claimed in claim 1, wherein the coolant flow is throttled as a function of the pressure drop at the coolant pump.

5. A method of controlling the flow-rate distribution in a coolant circuit for a motor vehicle having an engine, comprising:
    circulating coolant in the coolant circuit comprised of a first branch for cooling the engine, a second branch for heating a passenger compartment, a third branch for charge-air cooling, a fourth branch for oil cooling, including a coolant pump, a first heat exchanger in the first branch for engine cooling, a second heat exchanger in the second branch for passenger compartment heating, a third heat exchanger in the third branch for charge-air cooling, and a fourth heat exchanger in the fourth branch for oil cooling, wherein the branches connect upstream of the pump; and controlling the coolant flow at at least one of the charge-air cooler and the oil cooler by throttling as a function of coolant pressure drop across a respective one of the coolers.

6. The method as claimed in claim 5, wherein the coolant flow is throttled and kept at a constant value when coolant saturation of the heat exchanger is reached or a predetermined pressure drop is reached.

7. The method as claimed in claim 6, wherein the coolant flow at the second heat exchanger is throttled.

8. The method as claimed in claim 7, wherein the coolant flow at the first heat exchanger is throttled.

9. The method as claimed in claim 5, wherein the coolant flow is throttled as a function of the pressure drop at the coolant pump.

10. An apparatus for controlling the flow-rate distribution in a coolant circuit for a motor vehicle having an engine, comprising: a coolant circuit comprised of a first branch for cooling the engine and a second branch for heating a passenger compartment, a coolant pump in said coolant circuit, a first heat exchanger in the first branch for cooling coolant and a second heat exchanger in the second branch for heating air with the coolant, and a throttling member in at least one of said first and second branches, the throttling member being activated by a differential pressure of the coolant across a respective one of the heat exchangers.

11. The apparatus as claimed in claim 10, wherein one of the first and second heat exchangers includes the throttling member.

12. An apparatus for controlling the flow-rate distribution in a coolant circuit for a motor vehicle having an engine, comprising: a coolant circuit comprised of a first branch for cooling the engine and a second branch for heating a passenger compartment, a coolant pump in said coolant circuit, a first heat exchanger in the first branch for cooling coolant and a second heat exchanger in the second branch for heating air with the coolant, and a throttling member in at least one of said first and second branches, the throttling member being activated by a differential pressure of the coolant across a respective heat exchanger, wherein the throttling member is arranged in the region of a partition, which is arranged between an inlet chamber and an outlet chamber of a water tank of the air heater heat exchanger.

13. An apparatus for controlling the flow-rate distribution in a coolant circuit for a motor vehicle having an engine, comprising: a coolant circuit comprised of a first branch for cooling the engine and a second branch for heating a passenger compartment, a coolant pump in said coolant circuit, a first heat exchanger in the first branch for cooling coolant and a second heat exchanger in the second branch for heating coolant, a throttling member in at least one of said first and second branches, the throttling member being activated by a differential pressure of the coolant in the coolant circuit, and a valve element for changing the flow cross section of the coolant circuit, and wherein the throttling member comprises a diaphragm actuated by the coolant pressure on an inflow side and by the coolant pressure on a return side, and activates said shut-off element for changing the flow cross section of the coolant circuit.

14. The apparatus as claimed in claim 13, wherein the valve element changes the flow cross section of an outlet pipe connection of the heater exchanger.

* * * * *